US007928984B1

(12) United States Patent
Yhann et al.

(10) Patent No.: US 7,928,984 B1
(45) Date of Patent: Apr. 19, 2011

(54) EFFICIENT DATA PACKAGING FOR RENDERING BÉZIER CURVES ON A GPU

(75) Inventors: Stephan R. Yhann, Renton, WA (US); Prasun Choudhury, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 872 days.

(21) Appl. No.: 11/848,948

(22) Filed: Aug. 31, 2007

(51) Int. Cl.
*G06T 11/20* (2006.01)
(52) U.S. Cl. ....................................................... 345/442
(58) Field of Classification Search .................. 345/442, 345/647
See application file for complete search history.

(56) References Cited

U.S. PATENT DOCUMENTS

| | | | |
|---|---|---|---|
| 6,295,072 B1 | 9/2001 | Pon et al. | |
| 6,954,211 B2 | 10/2005 | Michail et al. | |
| 7,050,067 B2 | 5/2006 | Raubacher et al. | |
| 7,116,327 B2 | 10/2006 | Katka | |
| 7,127,525 B2 | 10/2006 | Coleman et al. | |
| 7,239,319 B2 | 7/2007 | Loop | |
| 2007/0097123 A1 | 5/2007 | Loop et al. | |

FOREIGN PATENT DOCUMENTS

EP          1630745 A2 *  1/2006

OTHER PUBLICATIONS

U.S. Appl. No. 11/874,600, filed Oct. 18, 2007.
Seth J. Teller and Carlo H. Sequin, "Modeling Implicit Quadrics and Free-form Surfaces With Trimmed Rational Quadratic Bezier Patches," Technical Report No. UCB/CSD-90-577, Jun. 1990, University of California-Berkeley.
U.S. Appl. No. 11/848,950, filed Aug. 31, 2007.
U.S. Appl. No. 11/848,943, filed Aug. 31, 2007.
Bala R. Vatti, "A Generic Solution to Polygon Clipping," Communications of the ACM, Jul. 1992, pp. 56-63, vol. 35, Issue 7, ACM Press, New York, NY.
Eric Chan, "Fast Antialiasing Using Prefiltered Lines on Graphics Hardware," Feb. 2004, http://people.csail.mit.edu/ericchan/articles/prefilter/.
U.S. Appl. No. 11/848,940, filed Aug. 31, 2007.
Charles Loop and Jim Blinn, "Resolution Independent Curve Rendering Using Programmable Graphics Hardware," ACM SIGGRAPH 2005, 2005, pp. 1000-1009, ACM Press, New York, NY.
John D. Hobby, "Rasterization of Nonparametric Curves," ACM Transactions on Graphics, Jul. 1990, pp. 262-277, vol. 9, Issue 3, ACM Press, New York, NY.
Fiaz Hussain and Michael L.V. Pitteway, "Rasterizing the Outlines of Fonts," Electronic Publishing, Sep. 1993, pp. 171-181, vol. 6, No. 3.
Zheng Qin, Michael D. McCool, and Craig S. Kaplan, "Real-Time Texture-Mapped Vector Glyphs," Symposium on Interactive 3D Graphics, 2006, pp. 125-132, ACM Press, New York, NY.

* cited by examiner

*Primary Examiner* — Jeffery A Brier
(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for rendering Bézier curves using a graphics processing unit (GPU). In one embodiment, a triangle representing a quadratic Bézier curve is sent to the GPU, wherein the triangle comprises only one texture coordinate per vertex, and wherein each texture coordinate comprises a first coordinate of the respective vertex in a canonical space. In one embodiment, a second coordinate in the canonical space for each vertex sent to the GPU may be determined based on the first coordinate in the canonical space for the respective vertex. In one embodiment, the quadratic Bézier curve is rendered using the GPU.

15 Claims, 6 Drawing Sheets

US 7,928,984 B1

EFFICIENT DATA PACKAGING FOR RENDERING BÉZIER CURVES ON A GPU

BACKGROUND

1. Field of the Invention

The present invention is directed to computer systems; and more particularly, it is directed to the rendering of curves using computer systems.

2. Description of the Related Art

As the power and complexity of personal computer systems increase, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

A GPU may include various built-in and configurable structures for rendering digital images to an imaging device. Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, Bézier curves, and text characters) may be based upon mathematical equations to represent parts of vector graphics data in digital images. The geometric objects may typically be located in two-dimensional or three-dimensional space. To render vector graphics on raster-based imaging devices (e.g., most display devices and printers), the geometric objects are typically converted to raster graphics data in a process called rasterization.

Graphical data may often be expressed in a structured format that complies with a particular specification or model for representing such data. Instead of requiring application programs to describe every page as a full-resolution pixel array, a high-level imaging model may enable applications to describe the appearance of pages containing text, graphical shapes, and sampled images in terms of abstract graphical elements rather than directly in terms of device pixels. Such specifications and models may often be implemented across multiple computing platforms to facilitate the exchange of graphical data. The Adobe® PostScript® language, Adobe® Portable Document Format, and Adobe® Imaging Model, for example, include various structures and commands to describe complex two-dimensional graphical data including geometric models and bitmapped images.

One geometric object used in the Adobe® Imaging Model is the Bézier curve. A cubic Bézier curve is a parametric curve defined by four points ($P_0$, $P_1$, $P_2$, $P_3$) in a plane or in three-dimensional space. The curve starts at $P_0$ and ends at $P_3$; the curve is influenced by the position of the control points $P_1$ and $P_2$ relative to the endpoints $P_0$ and $P_3$. Similarly, a quadratic Bézier curve is a parametric curve defined by two endpoints and an additional control point. In the Adobe® PostScript® language and the Adobe® Imaging Model, a Bézier curve is defined by the "curveto" operation applied to the control points.

A typical approach to rendering a Bézier curve is to "flatten" the curve by breaking it into a series of line segments that approximate the shape of the original curve. Another approach for rendering Bézier curves is described in "Resolution Independent Curve Rendering Using Programmable Graphics Hardware" (Charles Loop and Jim Blinn, ACM SIGGRAPH 2005, pages 1000-1009). The parameters of the Bézier curve are sent to the GPU as the attributes of the vertices of one or more triangles corresponding to the Bézier curve. To render a cubic Bézier curve in the GPU using the prior approach, four parameters needed for evaluation of the curve are sent to the GPU as four vertex attributes for each vertex: three attributes (u, v, w) representing coordinates in canonical space and one attribute indicating the side of the curve to render. To render a quadratic Bézier curve in the GPU using the prior approach, three parameters needed for evaluation of the curve are sent to the GPU as three vertex attributes for each vertex: two attributes (u, v) representing coordinates in canonical space and one attribute indicating the side of the curve to render.

SUMMARY

Various embodiments of systems, methods, and computer-readable storage media for rendering Bézier curves using a graphics processing unit (GPU) are disclosed. In one embodiment, a triangle representing a quadratic Bézier curve is sent to the GPU. The triangle may represent a mapping of the quadratic Bézier curve into a canonical space. The triangle may comprise only one texture coordinate per vertex. The texture coordinate per vertex may comprise a first coordinate (u) of the respective vertex in the canonical space, while a second coordinate (v) in canonical space and a sign are not sent to the GPU. The value of u may optionally be multiplied by the sign so that u indicates which side of the curve to draw.

In one embodiment, the second coordinate (v) in the canonical space for each vertex sent to the GPU may be determined at the GPU based on the first coordinate (u) in the canonical space for the respective vertex. In one embodiment, the quadratic Bézier curve is rendered using the GPU. In one embodiment, the function $f$: $u*(u*u-v)$ (i.e., $f(u,v)=u^3-uv$) may be evaluated in the pixel shader to render the curve. By reducing the number of texture coordinates sent to the GPU for each triangle from three to one, the GPU's memory and bandwidth resources may be used more efficiently.

Figure 1:
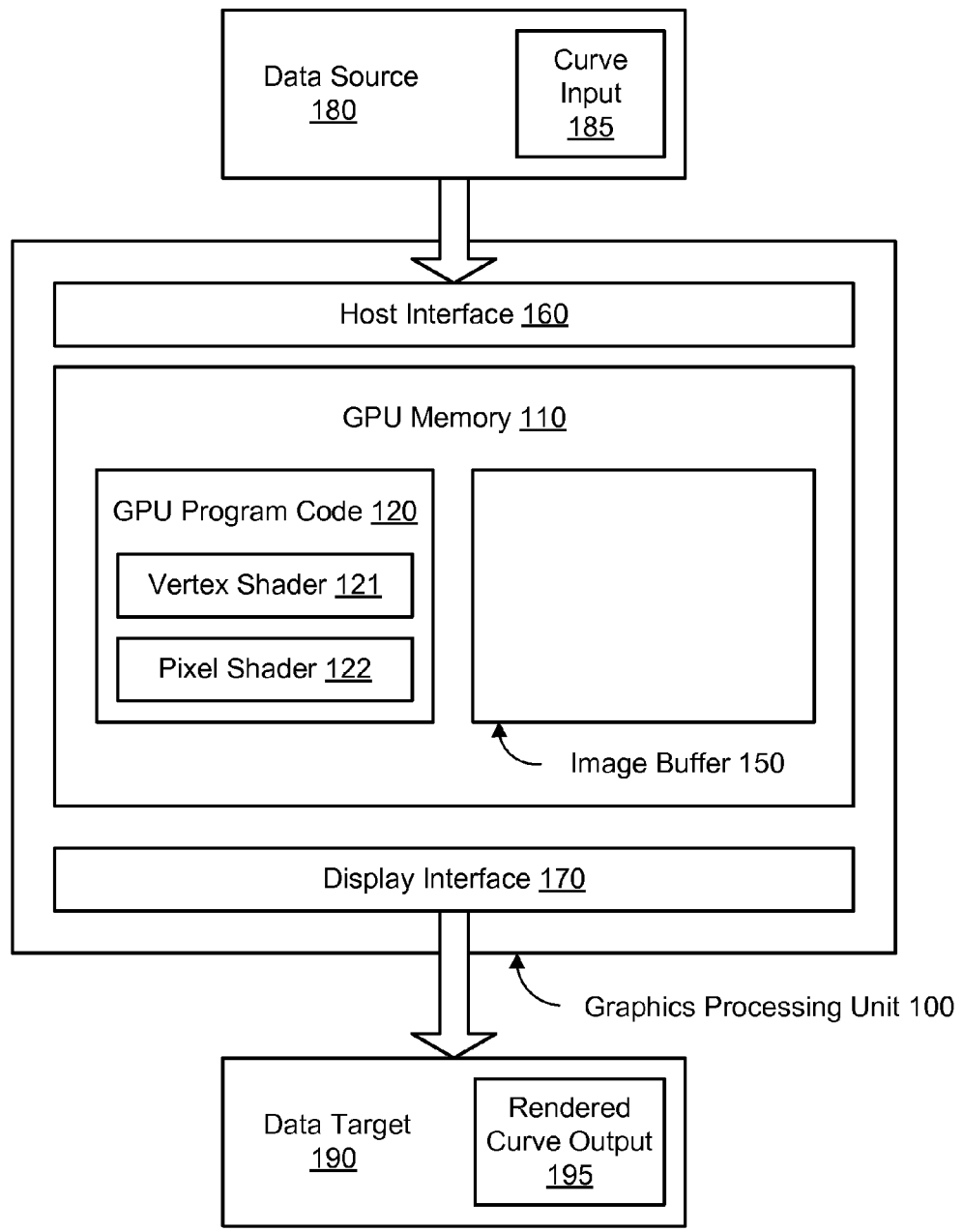
FIG. 1 is a block diagram illustrating one embodiment of a graphics processing unit (GPU) configured for rendering Bézier curves.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 8:
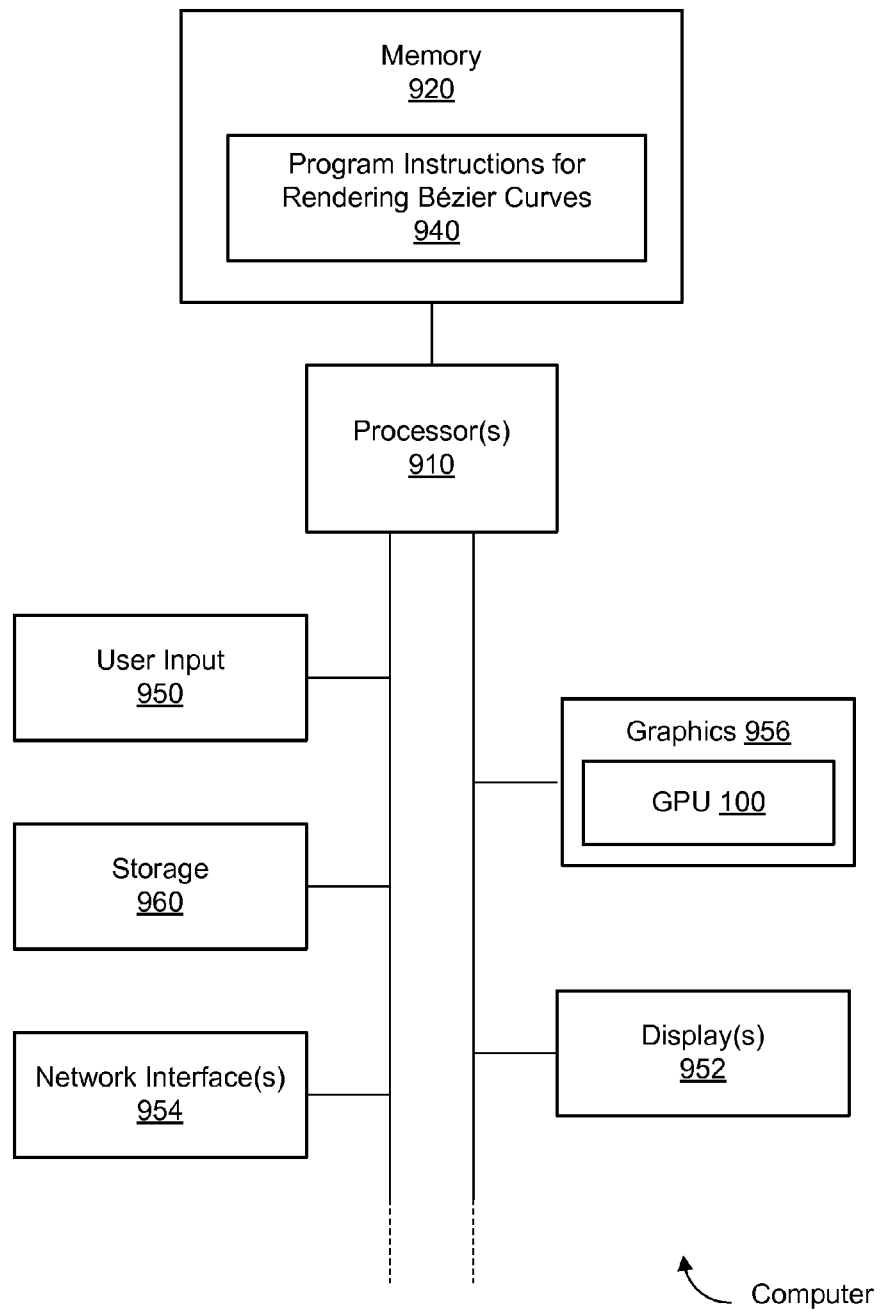
FIG. 8 is a block diagram illustrating constituent elements of a computer system that is configured to implement embodiments of the system and method for rendering Bézier curves.

Using embodiments of the systems and methods described herein, Bézier curves may be rendered efficiently using a graphics processing unit (GPU). FIG. 1 is a block diagram illustrating one embodiment of a GPU 100 configured for rendering Bézier curves. The GPU 100, also referred to herein as a graphics processor, may comprise a dedicated graphics rendering device associated with a computer system. An example of a suitable computer system 900 for use with a GPU is illustrated in FIG. 8. Turning back to FIG. 1, the GPU 100 may include numerous specialized components configured to optimize the speed of rendering graphics output. For example, the GPU 100 may include specialized components for rendering three-dimensional models, for applying textures to surfaces, etc. For the sake of illustration, however, only a limited selection of components is shown in the example GPU 100 of FIG. 1. It is contemplated that GPU architectures other than the example architecture of FIG. 1 may be suitable for implementing the techniques described herein. The GPU 100 may implement one or more application programmer interfaces (APIs) that permit programmers to invoke the functionality of the GPU. Suitable GPUs may be commercially available from vendors such as NVIDIA Corporation, ATI Technologies, and others.

The GPU 100 may include a host interface 160 configured to communicate with a data source 180 (e.g., a communications bus and/or processor(s) 910 of a host computer system 900, or the host system itself). For example, the data source 180 may provide input data (e.g., a scene comprising one or more geometric objects including one or more Bézier curves) and/or executable program code to the GPU 100. In some embodiments, the host interface 160 may permit the movement of data in both directions between the GPU 100 and the data source 180. The GPU 100 may also include a display interface 170 for providing output data to a data target 190. For example, the data target 190 may comprise a display device 952, and the GPU 100 (along with other graphics components and/or interfaces 956) may "drive" the display 952 by providing graphics data at a particular rate from a screen buffer (e.g., the image buffer 150).

In one embodiment, the GPU 100 may include internal memory 110. The GPU memory 110, also referred to herein as "video memory" or "VRAM," may comprise random-access memory (RAM) which is accessible to other GPU components. As will be described in greater detail below, the GPU memory 110 may be used in some embodiments to store various types of data and instructions such as input data, output data, intermediate data, program instructions for performing various tasks, etc. In one embodiment, the GPU 100 may also be configured to access memory 920 of a host computer system 900 via the host interface 160.

In one embodiment, program instructions 940 may be stored in the memory 920 of the host computer system 900 and executed by the host computer system 900 to generate rendered Bézier curve output 195 based on Bézier curve input 185. The curve input 185 may include a scene comprising one or more geometric objects (e.g., as vertices and associated data in a tessellation). The curve input 185 may comprise a plurality of quadratic Bézier curves and/or cubic Bézier curves. A quadratic Bézier curve is a parametric curve defined by three points ($P_0$, $P_1$, $P_2$) in a plane or in three-dimensional space. The quadratic Bézier curve starts at $P_0$ and ends at $P_2$; the quadratic Bézier curve is influenced by the position of the control points $P_1$ relative to the endpoints $P_0$ and $P_2$. A cubic Bézier curve is a parametric curve defined by four points ($P_0$, $P_1$, $P_2$, $P_3$) in a plane or in three-dimensional space. The curve starts at $P_0$ and ends at $P_3$; the curve is influenced by the position of the control points $P_1$ and $P_2$ relative to the endpoints $P_0$ and $P_3$. As will be discussed in greater detail below, the number of attributes sent to the GPU 100 for each curve may be reduced using the systems and methods described herein.

In one embodiment, the GPU 100 may include GPU program code 120 that is executable by the GPU 100 to perform aspects of the techniques discussed herein. For example, the geometric objects in the curve input 185 may be rasterized to pixels during a rendering process including execution of the GPU program code 120 on the GPU 100. Elements of the GPU program code 120 may be provided to the GPU 100 by a host computer system (e.g., the data source 180) and/or native to the GPU 100. In one embodiment, the GPU program code 120 may comprise a vertex shader 121. A vertex shader 121 comprises program instructions that are executable by the GPU 100 to determine properties (e.g., position) of a particular vertex. A vertex shader may expect input such as uniform variables (e.g., constant values for each invocation of the vertex shader) and vertex attributes (e.g., per-vertex data). In one embodiment, the GPU program code 120 may comprise a pixel shader 122. A pixel shader 122 comprises program instructions that are executable by the GPU 100 to determine properties (e.g., color) of a particular pixel. A pixel shader may also be referred to as a fragment shader. A pixel shader may expect input such as uniform variables (e.g., constant values for each invocation of the pixel shader) and pixel attributes (e.g., per-pixel data). In generating the rendered curve output 195, both the vertex shader 121 and the pixel shader 122 may be executed at various points in the graphics pipeline.

The GPU memory 100 may comprise one or more buffers, and each buffer may comprise a two-dimensional array of pixel data (e.g., color values) and/or pixel metadata (e.g., depth values, stencil values, etc.). As illustrated in FIG. 1, for example, the GPU memory 110 may comprise an image buffer 150. The image buffer 150 may store intermediate or final pixel values generated in the rendering process. In one embodiment, the image buffer 150 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In another embodiment, the image buffer 150 may comprise a multi-sampling buffer usable for automatic anti-aliasing.

As discussed above, each cubic Bézier curve intended to be rendered may be subdivided into a respective set of quadratic Bézier curves prior to sending the curve input 185 to the GPU 100. Although this approach may result in sending more triangles to the GPU 100, fewer per-vertex attributes may be sent for each triangle. In one embodiment, one attribute per vertex may be sent to the GPU for each quadratic Bézier curve instead of three attributes per vertex for each cubic Bézier curve. Thus, usage of GPU memory 110 is reduced for each triangle associated with a curve. Because all vertices of triangles in a path generally use the same vertex data structure, usage of GPU memory 110 may also be reduced for other triangles (e.g., interior triangles and other non-curve triangles). Additionally, the computation on the GPU 100 (e.g., in computing curve parameters for rendering) may be less expensive for the quadratic Bézier curves than for the corresponding cubic Bézier curve. For example, fewer instructions may be used in the pixel shader. Furthermore, the computation in the GPU and/or CPU may be more robust through avoidance of singularities near regions around cusps and sharp discontinuities of cubic Bézier curves.

Figure 2:
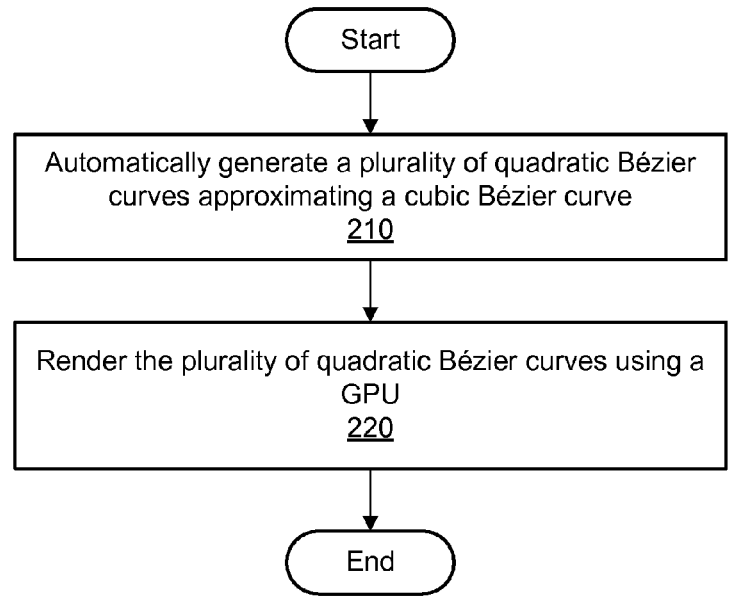
FIG. 2 is a flow diagram illustrating a method for rendering cubic Bézier curves using a GPU according to one embodiment.

FIG. 2 is a flow diagram illustrating a method for rendering cubic Bézier curves using a GPU according to one embodiment. As shown in block 210, a plurality of quadratic Bézier curves may be automatically generated. The plurality of quadratic Bézier curves may approximate or otherwise represent a cubic Bézier curve. Subdivision of the cubic Bézier curve into the plurality of quadratic Bézier curves may be performed using any suitable algorithm. Generally, the number of quadratic Bézier curves used to fit a cubic Bézier curve may depend on a fitness tolerance value and the shape of the cubic Bézier curve. In some algorithms, a fixed number of quadratic Bézier curves may be generated. In other embodiments, the number of quadratic Bézier curves may be estimated based on factors such as the position of the control points of the cubic Bézier curve, the error tolerance, etc. In one embodiment, two quadratic Bézier curves may be generated for each cubic Bézier curve. In another embodiment, four quadratic Bézier curves may be generated for each cubic Bézier curves. In other embodiments, other suitable numbers of quadratic Bézier curves (e.g., from one to many) may be generated. The plurality of quadratic Bézier curves may be sent to the GPU as a sequential list. An example of the subdivision of a cubic Bézier curve is discussed below with respect to FIG. 3.

The plurality of quadratic Bézier curves may be sent to the GPU 100 as a sequential list. Turning back to FIG. 2, as shown in block 220, the plurality of quadratic Bézier curves may then be rendered using the GPU 100. The rendering of the quadratic Bézier curves is further described below with reference to FIG. 4.

Figure 3:
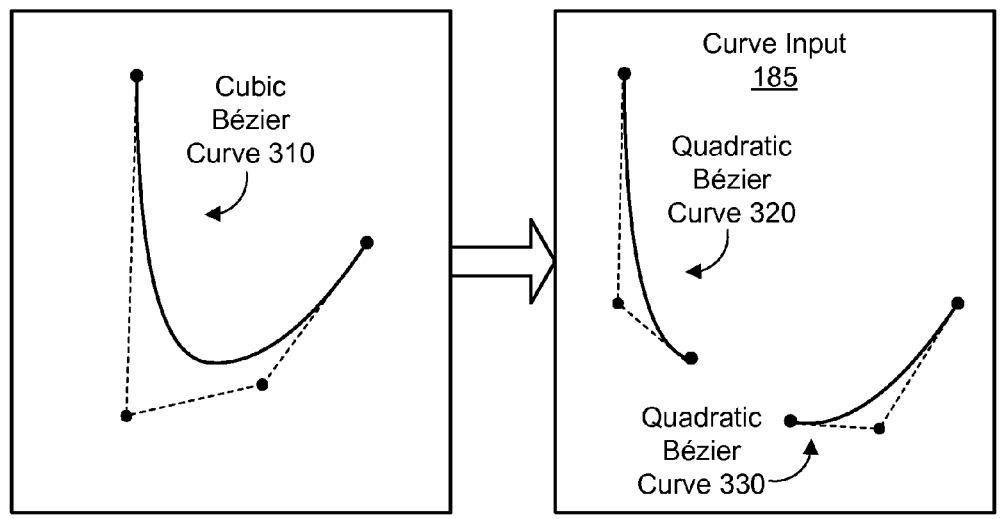
FIG. 3 is a block diagram illustrating the subdivision of a cubic Bézier curve according to one embodiment.

FIG. 3 is a block diagram illustrating the subdivision of a cubic Bézier curve according to one embodiment. From a cubic Bézier curve 310 (shown with two endpoints and two additional control points), two or more quadratic Bézier curves may be generated that approximate the original curve. In the example shown in FIG. 3, two quadratic Bézier curves 320 and 330 are generated. Subdivision of the cubic Bézier curve may be performed using any suitable algorithm. For example, the original cubic Bézier curve 310 may be divided by first determining its midpoint. The midpoint of the cubic Bézier curve may then determine two adjoining endpoints of the two new quadratic Bézier curves 320 and 330. For purposes of illustration, a gap is shown between the two quadratic Bézier curves 320 and 330; however, in the internal representation and in the rendered form of the quadratic Bézier curves 320 and 330, the two curves 320 and 330 may adjoin at the shared endpoint such that the two new curves approximate the original cubic Bézier curve. The additional control point for each of the two quadratic Bézier curves 320 and 330 may also be suitably determined. In one embodiment, the cubic Bézier curve 310 may be recursively subdivided until a desired condition is met or until a desired number of resulting quadratic Bézier curves are generated. For example, the quadratic Bézier curves 320 and 330 may be further subdivided so that four resulting quadratic Bézier curves approximate the original cubic Bézier curve. Locations on the quadratic Bézier curves resulting from the subdivision may have the same color and alpha values as the corresponding locations on the original cubic Bézier curve.

Figure 4:
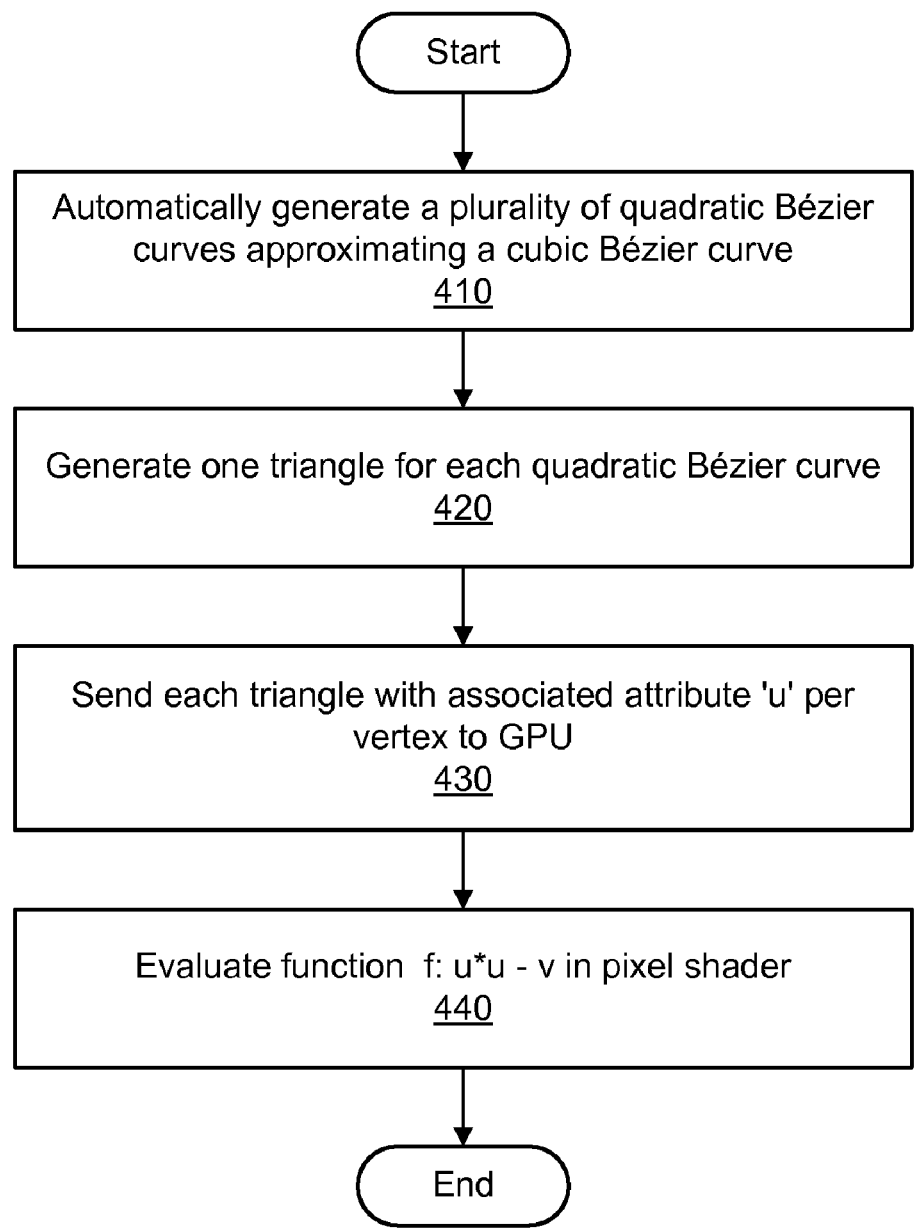
FIG. 4 is a flow diagram illustrating further aspects of a method for rendering cubic Bézier curves using a GPU according to one embodiment.

FIG. 4 is a flow diagram illustrating further aspects of a method for rendering cubic Bézier curves using a GPU 100 according to one embodiment. As shown in block 410, a plurality of quadratic Bézier curves may be automatically generated as discussed above with respect to FIGS. 2 and 3. The plurality of quadratic Bézier curves may approximate or otherwise represent a cubic Bézier curve.

As shown in block 420, one triangle may be generated for each quadratic Bézier curve. As shown in FIG. 3, for example, each of the quadratic Bézier curves 320 and 330 may fit within a triangle determined by the curve's three control points (i.e., the two endpoints and the additional control point). Because the triangles representing the quadratic Bézier curves 320 and 330 fit the curve more closely than triangles representing the original cubic Bézier curve 310, fewer pixels are typically passed to the pixel shader and clipped in the pixel shader.

Turning back to FIG. 4, as shown in block 430, each triangle may be sent to the GPU with one attribute per vertex representing a parameter for a canonical form of the corresponding quadratic Bézier curve. In one embodiment, each quadratic Bézier curve is transformed into a canonical quadratic Bézier curve by mapping the curve into canonical space. A canonical quadratic Bézier curve is described by three control points A, B, and C, where the two-dimensional (u, v) coordinates of the three control points are given by A: (0, 0), B: (0.5, 0), and C: (1, 1). For the function $f$: $u*u-v$, $f=0$ indicates points that lie on the curve. Because the parameter v can be evaluated given the parameter u, it may be sufficient to pass the parameter u to the GPU 100 but not the parameter v for each vertex in the triangle representing the quadratic Bézier curve. The value of the vertex attributes may be interpolated for every pixel (based on the three vertices) and sent to the pixel shader. In one embodiment, the interpolation may be performed during a rasterization stage between the vertex shader and the pixel shader. As shown in block 440, the function $f$: $u*u-v$ (i.e., $f(u,v)=u^2-v$) may be evaluated in the pixel shader to draw the curve. In one embodiment, pixels for which $f<0$ are considered to be inside the curve, and other pixels are considered to be outside the curve. In one embodiment, an additional per-vertex attribute (e.g., a positive or negative sign) indicating a side of the curve to paint may be sent to the GPU.

In contrast to the approach described in FIG. 4, rendering a cubic Bézier curve directly in the GPU (i.e., without conversion of the cubic Bézier curve to a plurality of quadratic Bézier curves) typically requires greater use of the computational and memory resources of the GPU 100. A cubic Bézier curve is determined by four control points (u, v, w) given by A: $(u_1, v_1, w_1)$, B: $(u_2, v_2, w_2)$, C: $(u_3, v_3, w_3)$, and D $(u_4, v_4, w_4)$. Computation of the parameters for the four control points of the cubic Bézier curve may involve expensive matrix and/or vector operations. Additionally, evaluation of the function $f$: sign*$(u*u*u-v*w)$, where the sign denotes the side of the curve to be painted, is performed rather than evaluation of the simpler function $f$: $u*u-v$ discussed above. The use of simpler quadratic Bézier curves may also avoid ambiguous inside-outside classifications for loops and self-intersections found in some cubic Bézier curves.

In one embodiment, rendering efficiency may be achieved through efficient packaging of per-vertex data associated with Bézier curves sent to the GPU 100. In a prior approach, three texture coordinates as per-vertex attributes (i.e., u, v, and a sign indicating which side of the curve to draw) are sent to the GPU for each vertex of each triangle; the function $f$: sign*$(u*u-v)$ is then evaluated by the GPU such that only pixels for which $f>=0$ are rendered. By reducing the amount of texture coordinates sent to the GPU 100 for each triangle, the efficiency of the use of GPU resources may be improved. For example, GPU memory usage may be reduced, and bandwidth for data transfer between the host system and the GPU 100 may also be reduced.

Figure 5:
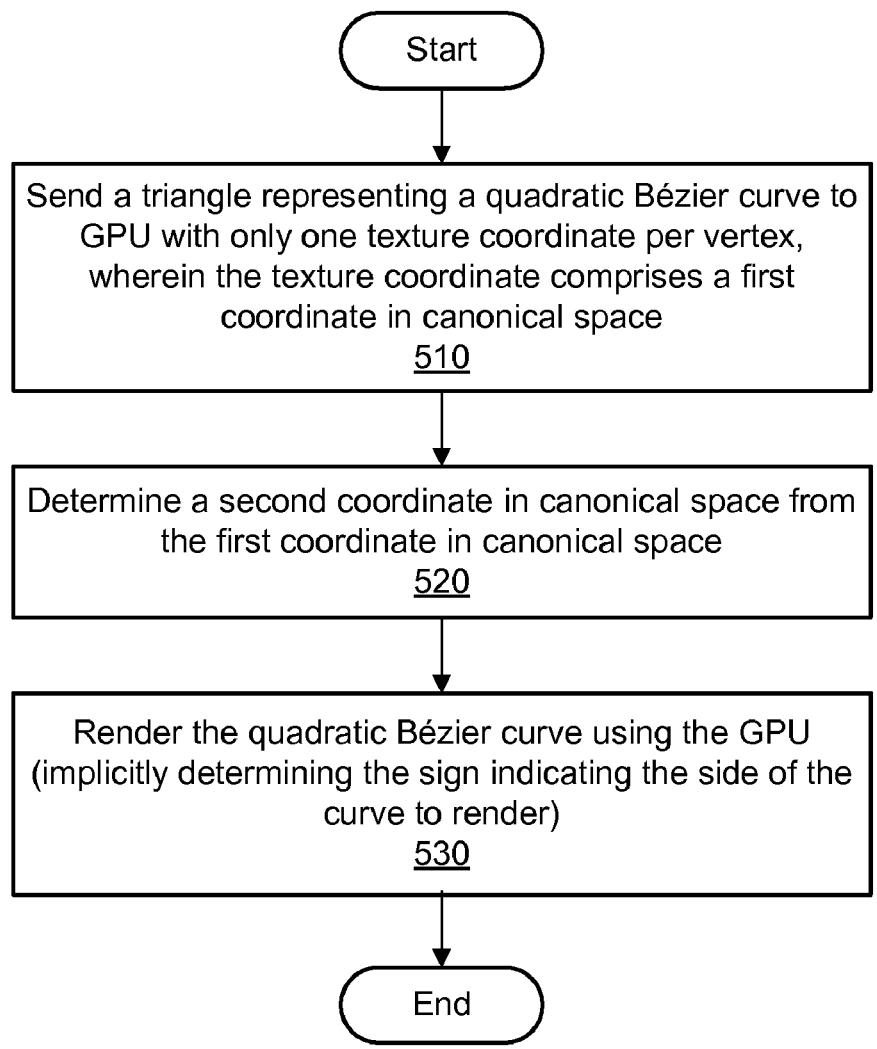
FIG. 5 is a flow diagram illustrating a method for efficient packaging of data associated with Bézier curves according to one embodiment.

FIG. 5 is a flow diagram illustrating a method for efficient packaging of data associated with Bézier curves according to one embodiment. Each quadratic Bézier curve may be transformed into a canonical quadratic Bézier curve by mapping the curve into canonical space. A canonical quadratic Bézier curve is described by three control points A, B, and C, where the two-dimensional (u, v) coordinates of the three control points are given by A: (0, 0), B: (0.5, 0), and C: (1, 1). For the function $f$: $u*u-v$, $f=0$ indicates points that lie on the curve. As shown in block 510, each triangle may be sent to the GPU with one attribute (i.e., texture coordinate) per vertex representing a first coordinate in canonical space for a canonical form of the corresponding quadratic Bézier curve (i.e., as mapped to canonical space). For example, the coordinate u may be sent as the per-vertex attribute, while v and the sign are not sent to the GPU. The value of u may optionally be multiplied by the sign so that u indicates which side of the curve to draw.

As shown in block 520, the value of a second coordinate in canonical space (i.e., v) may be determined from the value of the first coordinate in canonical space (i.e., u) for each vertex sent to the GPU. Thus, $v=0$ when $u==0$, $v=0$ when $u==0.5$, and $v=1$ when $u==1$. The vertex shader may be called once for each vertex. The following vertex shader program code illustrates this technique in one embodiment, where each vertex has only one texture coordinate (e.g., u) as input:

```
void main_vsQuadratic(in float3 pos:POSITION, in float tex:TEXCOORD0, out float4 oPos:POSITION, out float2 oTex:TEXCOORD0)
{
  otex=float2(tex,0);
  oPos=mul(float4(pos,1.0), mWorldViewProjection);
  if(abs(tex)==1)
    oTex.y=1;
}
```

The value of the per-vertex attributes may be interpolated for every pixel (based on the three vertices) and sent to the pixel shader. As shown in block 530, the curve may be rendered in the GPU 100. In one embodiment, the function $f$: $u*(u*u-v)$ (i.e., $f(u,v)=u^3-uv$) may be evaluated in the pixel shader to render the curve such that only pixels for which $f>=0$ are rendered while other pixels are clipped. In one embodiment, if the pixels on the left side of the curve are intended to be rendered instead of the pixels on the right side of the curve, then the sign of u can be reversed or "flipped" prior to sending the coordinate u to the GPU 100. Therefore, the value of the sign may be determined in block 530 even though the sign is not explicitly sent to the GPU 100 as a separate per-vertex attribute. The pixel shader may be called for each device pixel in a triangle. The following pixel shader program code illustrates this technique in one embodiment:

```
void main_psQuadratic(in float4 vPos:POSITION, in float2 vTex:TEXCOORD0, out float4 color:COLOR)
{
  clip(vtex.x*(vTex.x*vTex.x-vTex.y));
  color=float4(1,0,0,1);
}
```

Thus, a single texture coordinate sent to the GPU 100 for each vertex may represent both the position of the vertex in two-dimensional canonical space and the side of the curve to be painted. In one embodiment, two floating-point variables (e.g., representing v and the sign) may be eliminated from the per-vertex data sent to the GPU 100. Because the same vertex data structure is typically used for both curve-related triangles and other triangles in a scene or other batch sent to the GPU 100, the elimination of two variables per vertex in the data sent to the GPU 100 may result in resource savings throughout the entire scene or batch.

In other embodiments, the per-vertex data may be packaged efficiently by sending two per-vertex attributes rather than three to the GPU. In one embodiment, for example, each triangle may be sent to the GPU with two attributes per vertex (i.e., two texture coordinates per vertex) representing the first coordinate in canonical space and the second coordinate in canonical space but not the sign. In this case, the value of u may be multiplied by the sign so that u indicates which side of the curve to draw. In another embodiment, each triangle may be sent to the GPU with two attributes per vertex (i.e., two texture coordinates per vertex) representing the first coordinate in canonical space and the sign but not the second coordinate in canonical space.

Figure 6:
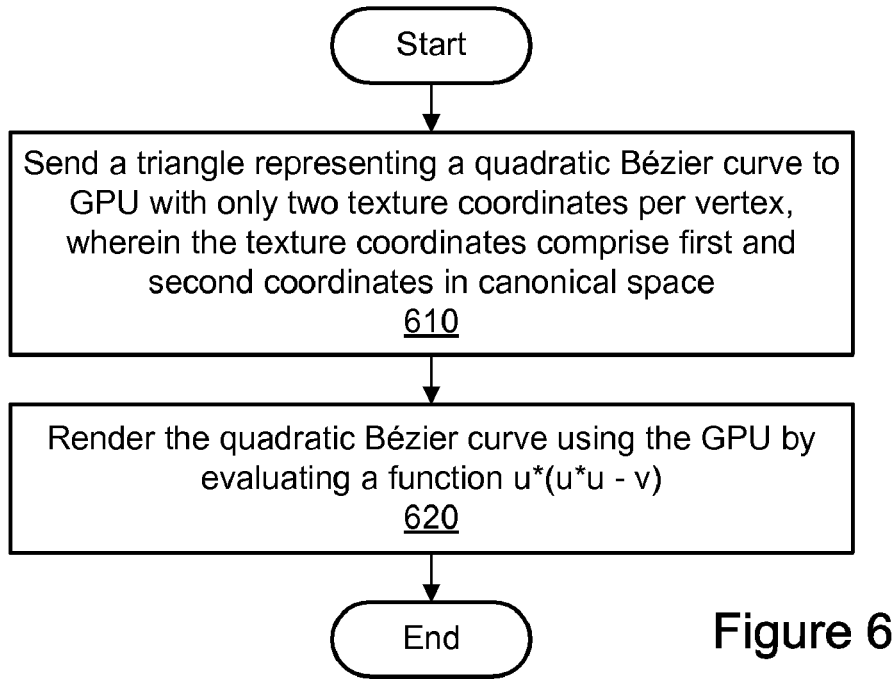
FIG. 6 is a flow diagram illustrating another method for efficient packaging of data associated with Bézier curves according to one embodiment.

FIG. 6 is a flow diagram illustrating another method for efficient packaging of data associated with Bézier curves according to one embodiment. As shown in block 610, a triangle representing a quadratic Bézier curve may be sent to the GPU. The triangle may comprise only two texture coordinates per vertex, and the two texture coordinates per vertex may comprise a first coordinate of the respective vertex in a canonical space and a second coordinate of the respective vertex in the canonical space. A sign of the first coordinate may optionally be reversed to flip the side of the quadratic Bézier curve to be rendered. As shown in block 620, the quadratic Bézier curve may be rendered using the GPU. In one embodiment, the curve may be rendered in the pixel shader by evaluating a function $u^3-uv$ for each pixel, wherein the first coordinate in the canonical space is u and the second coordinate in the canonical space is v.

Figure 7:
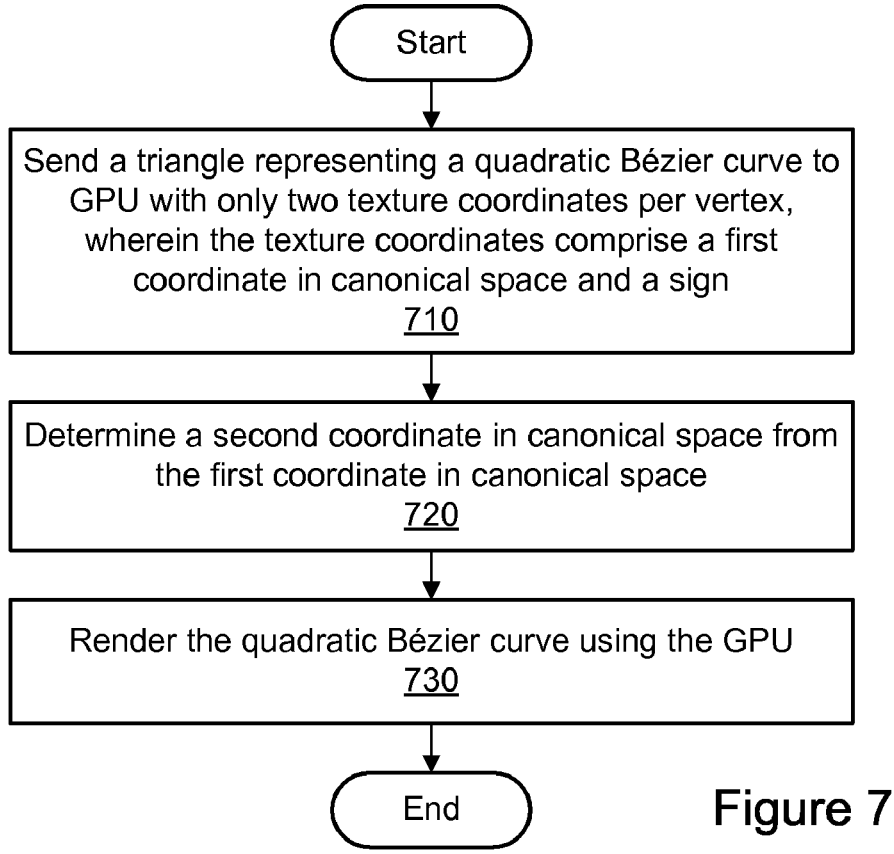
FIG. 7 is a flow diagram illustrating another method for efficient packaging of data associated with Bézier curves according to one embodiment.

FIG. 7 is a flow diagram illustrating another method for efficient packaging of data associated with Bézier curves according to one embodiment. As shown in block 710, a triangle representing a quadratic Bézier curve may be sent to the GPU. The triangle may comprise only two texture coordinates per vertex, and the two texture coordinates per vertex may comprise a first coordinate of the respective vertex in a canonical space and a sign indicating a side of the quadratic Bézier curve to render. As shown in block 720, a second coordinate in the canonical space for each vertex sent to the GPU may be determined based on the first coordinate in the canonical space for the respective vertex. As shown in block 730, the quadratic Bézier curve may be rendered using the GPU. In one embodiment, the curve may be rendered in the pixel shader by evaluating a function $u^3-uv$ for each pixel, wherein the first coordinate in the canonical space is u and the second coordinate in the canonical space is v.

Various embodiments may be chosen to match the capabilities of a particular GPU 100 (e.g., the GPU 100 may lack a vertex shader). In one embodiment, the techniques for efficient packaging of per-vertex data may be applied to the direct rendering of cubic Bézier curves using a GPU. In one embodiment, only three attributes may be sent to GPU 100 for each vertex associated with a cubic curve: e.g., the coordinates (u, v, w) in canonical space. The sign may be omitted. To represent the side of the curve to be rendered, the sign of u and v or u and w may be flipped prior to sending the per-vertex texture coordinates to the GPU 100. In the pixel shader of the GPU 100, a cubic Bézier curve is typically rendered by evaluating the function $f: u^3-v^*w$. By flipping the sign of u and v or u and w prior to sending the per-vertex texture coordinates to the GPU 100, a different side of the curve may be rendered by the pixel shader.

FIG. 8 is a block diagram illustrating constituent elements of a computer system 900 that is configured to implement embodiments of the system and method for rendering Bézier curves. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a GPU such as the GPU 100 illustrated in FIG. 1. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the curve-rendering techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 8, as illustrated by the ellipsis shown.

In various embodiments, the elements shown in FIGS. 2 and 4-7 may be performed in a different order than the illustrated order. In FIGS. 2 and 4-7 any of the operations described in the elements may be performed programmatically (i.e., by a computer according to a computer program). In FIGS. 2 and 4-7 any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   performing by a computer:
   determining a canonical quadratic Bézier curve based on a mapping of a quadratic Bézier curve to a canonical space, wherein the canonical quadratic Bézier curve comprises a first control point having coordinates (0, 0), a second control point having coordinates (0.5, 0), and a third control point having coordinates (1, 1);
   sending a triangle representing the canonical quadratic Bézier curve to a graphics processing unit (GPU), wherein the triangle comprises three vertices corresponding to the three control points, wherein the triangle comprises only one texture coordinate per vertex, wherein each texture coordinate comprises a first coordinate of the two coordinates of the respective vertex in the canonical space;
   determining a second coordinate in the canonical space for each vertex sent to the GPU based on the first coordinate in the canonical space for the respective vertex, wherein the second coordinate is determined using the GPU; and
   rendering the canonical quadratic Bézier curve using the GPU based on the first coordinate and the second coordinate for each vertex.

2. The method as recited in claim 1, further comprising:
   reversing a sign of the texture coordinate per vertex prior to sending the triangle to the GPU.

3. The method as recited in claim 1, wherein rendering the canonical quadratic Bézier curve using the GPU comprises evaluating a function $u^3-uv$ for each pixel, wherein the first coordinate in the canonical space is u and the second coordinate in the canonical space is v.

4. The method as recited in claim 1, wherein determining the second coordinate in canonical space for each vertex sent to the GPU based on the first coordinate in canonical space for the respective vertex is performed by executing a vertex shader program in the GPU.

5. The method as recited in claim 1, wherein rendering the canonical quadratic Bézier curve using the GPU is performed by executing a pixel shader program in the GPU.

6. A computer-readable storage medium, comprising program instructions, wherein the program instructions are computer-executable to implement:
   determining a canonical quadratic Bézier curve based on a mapping of a quadratic Bézier curve to a canonical space, wherein the canonical quadratic Bézier curve comprises a first control point having coordinates (0, 0), a second control point having coordinates (0.5, 0), and a third control point having coordinates (1, 1);
   sending a triangle representing the canonical quadratic Bézier curve to a graphics processing unit (GPU), wherein the triangle comprises three vertices corresponding to the three control points, wherein the triangle comprises only one texture coordinate per vertex, wherein each texture coordinate comprises a first coordinate of the two coordinates of the respective vertex in the canonical space;
   determining a second coordinate in the canonical space for each vertex sent to the GPU based on the first coordinate in the canonical space for the respective vertex, wherein the second coordinate is determined using the GPU; and
   rendering the canonical quadratic Bézier curve using the GPU based on the first coordinate and the second coordinate for each vertex.

7. The computer-readable storage medium as recited in claim 6, wherein the program instructions are computer-executable to implement:
   reversing a sign of the texture coordinate per vertex prior to sending the triangle to the GPU.

8. The computer-readable storage medium as recited in claim 6, wherein rendering the canonical quadratic Bézier curve using the GPU comprises evaluating a function $u^3-uv$ for each pixel, wherein the first coordinate in the canonical space is u and the second coordinate in the canonical space is v.

9. The computer-readable storage medium as recited in claim 6, wherein determining the second coordinate in canonical space for each vertex sent to the GPU based on the first coordinate in canonical space for the respective vertex is performed by executing a vertex shader program in the GPU.

10. The computer-readable storage medium as recited in claim 6, wherein rendering the canonical quadratic Bézier curve using the GPU is performed by executing a pixel shader program in the GPU.

11. A system, comprising:
   at least one processor;
   a memory coupled to the at least one processor, wherein the memory stores a first set of program instructions; and
   a graphics processing unit (GPU) coupled to the at least one processor, wherein the GPU stores a second set of program instructions;
   wherein the first set of program instructions are executable by the at least one processor to:
      determine a canonical quadratic Bézier curve based on a mapping of a quadratic Bézier curve to a canonical space, wherein the canonical quadratic Bézier curve comprises a first control point having coordinates (0, 0), a second control point having coordinates (0.5, 0), and a third control point having coordinates (1, 1);
      send a triangle representing the canonical quadratic Bézier curve to the GPU, wherein the triangle comprises three vertices corresponding to the three control points, wherein the triangle comprises only one texture coordinate per vertex, wherein each texture coordinate comprises a first coordinate of the two coordinates of the respective vertex in the canonical space; and
   wherein the second set of program instructions are executable by the GPU to:
      determine a second coordinate in the canonical space for each vertex sent to the GPU based on the first coordinate in the canonical space for the respective vertex; and
      render the canonical quadratic Bézier curve using the GPU based on the first coordinate and the second coordinate for each vertex.

12. The system as recited in claim 11, wherein the first set of program instructions are executable by the at least one processor to:
   reverse a sign of the texture coordinate per vertex prior to sending the triangle to the GPU.

13. The system as recited in claim 11, wherein, in rendering the canonical quadratic Bézier curve, the second set of program instructions are executable by the GPU to evaluate a function $u^3-uv$ for each pixel, wherein the first coordinate in the canonical space is u and the second coordinate in the canonical space is v.

14. A computer-readable storage medium, comprising program instructions, wherein the program instructions are computer-executable to implement:
   determining a canonical quadratic Bézier curve based on a mapping of a quadratic Bézier curve to a canonical space, wherein the canonical quadratic Bézier curve comprises a first control point having coordinates (0, 0), a second control point having coordinates (0.5, 0), and a third control point having coordinates (1, 1);
   sending a triangle representing the canonical quadratic Bézier curve to a graphics processing unit (GPU), wherein the triangle comprises three vertices corresponding to the three control points, wherein the triangle comprises only two texture coordinates per vertex, wherein each two texture coordinates per vertex comprise a first coordinate of the two coordinates of the respective vertex in the canonical space and a sign indicating a side of the canonical quadratic Bézier curve to render;
   determining a second coordinate in the canonical space for each vertex sent to the GPU based on the first coordinate in the canonical space for the respective vertex, wherein the second coordinate is determined using the GPU; and
   rendering the canonical quadratic Bézier curve using the GPU based on the first coordinate and the second coordinate for each vertex and the sign.

15. The computer-readable storage medium as recited in claim 14, wherein rendering the canonical quadratic Bézier curve using the GPU comprises evaluating a function $u^3-uv$ for each pixel, wherein the first coordinate in the canonical space is u and the second coordinate in the canonical space is v.

* * * * *